United States Patent [19]

Corley, Jr.

[11] Patent Number: 4,505,359
[45] Date of Patent: Mar. 19, 1985

[54] VEHICLE CARGO ELEVATOR WITH UPRIGHT STORAGE

[76] Inventor: Quentin D. Corley, Jr., 326 S. Rock Island, Dallas, Tex. 75207

[21] Appl. No.: 447,488

[22] Filed: Dec. 7, 1982

[51] Int. Cl.³ .............................................. B66B 9/20
[52] U.S. Cl. .................................. 187/9 R; 414/557; 296/55
[58] Field of Search ............... 187/9 R; 414/557, 558, 414/917, 556, 546; 296/55, 56, 57 R

[56] References Cited

U.S. PATENT DOCUMENTS

| | | | |
|---|---|---|---|
| 3,035,721 | 5/1962 | McCarty et al. | 414/557 |
| 3,057,491 | 10/1962 | Schlensker | 214/557 |
| 3,084,815 | 4/1963 | Johnson | 414/557 |

Primary Examiner—Joseph J. Rolla
Assistant Examiner—Kenneth Noland
Attorney, Agent, or Firm—Peter J. Murphy

[57] ABSTRACT

An elevator platform is mounted by means of lift arms and parallel arms to a frame mounted under the truck bed. On the frame, the normal pivot axis for the parallel arms is aligned vertically above the pivot axis for the lift arms; and the pivot axes on the platform are similarly vertically aligned when the platform is in the horizontal load position. One of the parallel arms is articulated having an elbow intermediate its ends; and a control strut is mounted on the truck to be swung into engagement with the articulated arm adjacent to its elbow while the platform is being raised from the ground position. When so engaged, the proximal link of the articulated arm is locked against further upward movement, so that further upward movement of the lift arms will cause the gate to rotate upward 90° to a vertical storage position behind the truck bed. The frame pivot for the other parallel arm is mounted on an oscillating bracket, allowing that pivot to move to permit the rotation of the platform. The control strut and articulated arm are locked together to prevent downward movement of the gate until the lift arms are again actuated to effect rotation of the platform back to the horizontal load position.

8 Claims, 7 Drawing Figures

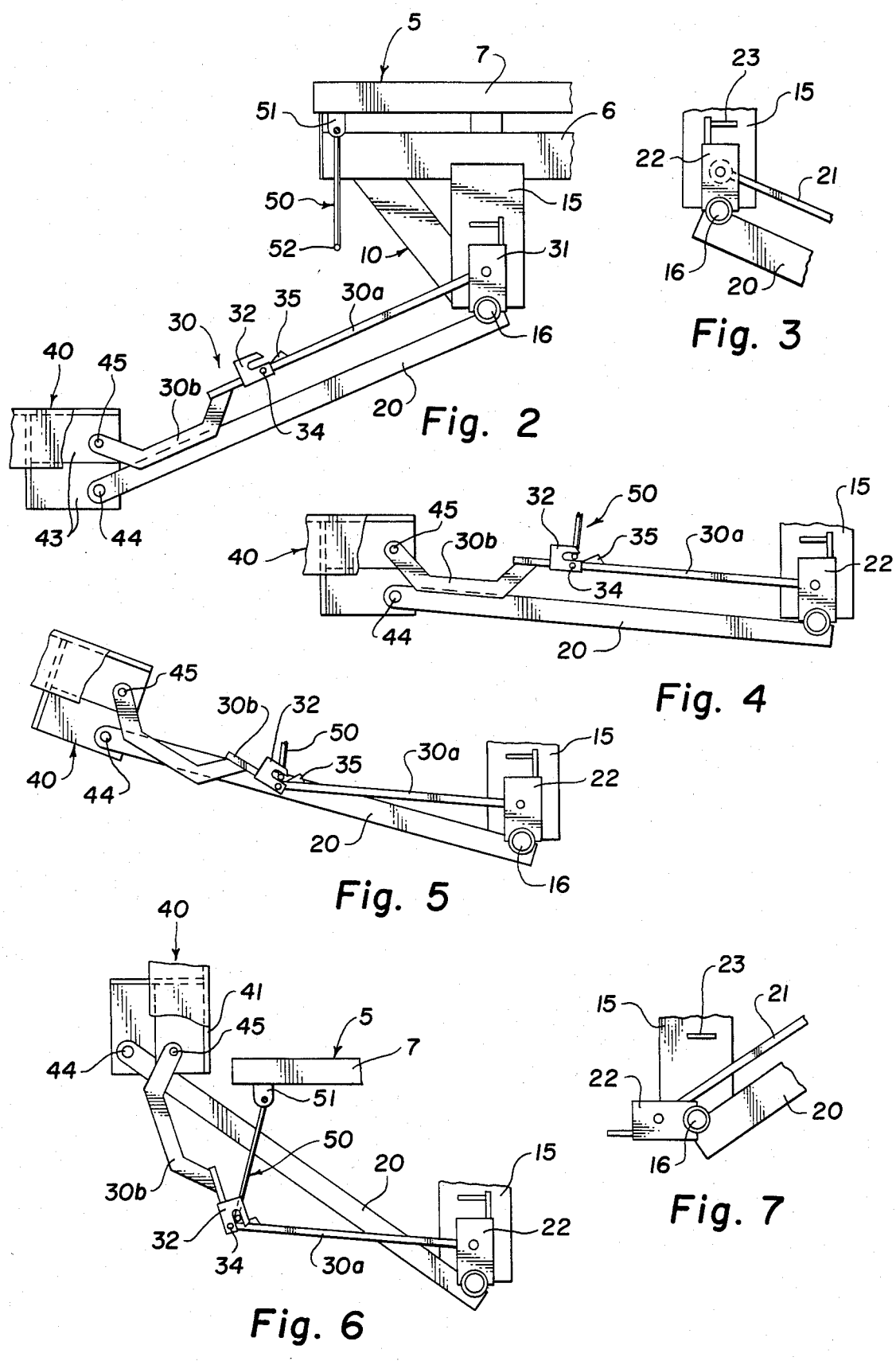

VEHICLE CARGO ELEVATOR WITH UPRIGHT STORAGE

This invention relates to cargo elevators, sometimes referred to as power operated tailgates, for attachment to a cargo vehicle such as a truck or trailer, particularly to the rear loading end of such truck or trailer. More particularly, this invention relates to such cargo elevators wherein the elevator platform is rotated between a horizontal load position and a vertical storage position.

An object of this invention is to provide an improved cargo elevator wherein the load platform is rotatable under power between a generally horizontal load position and a generally vertical storage position behind the cargo bed of the vehicle.

Another object of this invention is to provide a cargo elevator having novel means for effecting the rotation of the platform between the load position and the vertical storage position.

A further object of this invention is to provide an improved cargo elevator wherein, in the vertical storage position, the platform is supported in a manner to tend to swing toward the vehicle rather than away from it.

Still another object of this invention is to provide a cargo elevator having a novel mechanism for rotating the platform to a vertical storage position, and which prevents the gate from lowering in the event of hydraulic pressure loss.

These objects are accomplished in a cargo elevator for attachment to a cargo vehicle. A pair of laterally spaced lift arms are pivotally mounted on the vehicle for vertical oscillation. A pair of laterally spaced parallel arms are pivotally mounted on the vehicle for vertical oscillation; and an elevator platform is pivotally mounted on both pairs of arms in a manner to maintain the platform in a generally horizontal load position during the raising and lowering thereof through oscillation of those arms. A power means is provided for oscillating the lift arms. One of the parallel arms is articulated having a pivot elbow intermediate its ends. A control strut is mounted on the vehicle to be moved selectively into engagement with the articulated arm, being engageable during upward movement of the arm to effect articulation thereof and consequent rotation of the platform to a vertical storage position relative to the vehicle. The other parallel arm is mounted on the vehicle by means of a movable pivot, to allow that platform rotation. The control strut and articulated arm have coacting means for locking them together, to effect rotation of the platform to the load position when the lift arms are lowered.

The novel features and the advantages of the invention, as well as additional objects thereof, will be understood more fully from the following description when read in connection with the accompanying drawings.

DRAWINGS

FIG. 2 is a fragmentary side view of the cargo elevator of FIG. 1 from the curb side, with the platform at the ground position;

FIG. 3 is a fragmentary detail view of the parallel arm support for the street side parallel arm, with the platform in the ground position;

FIG. 4 is a fragmentary side view of the cargo elevator of FIG. 1 from the curb side, with the platform raised to the point where platform rotation to the storage position commences;

FIG. 5 is a fragmentary side view of the cargo elevator of FIG. 1 from the curb side, with the platform partially rotated to the storage position;

FIG. 6 is a fragmentary side view of the cargo elevator of FIG. 1 from the curb side, with the platform rotated to the storage position; and FIG. 7 is a fragmentary detail view of the parallel arm support for the street side parallel arm, with the platform rotated to the storage position.

DESCRIPTION OF THE PREFERRED EMBODIMENT

Figure 1:
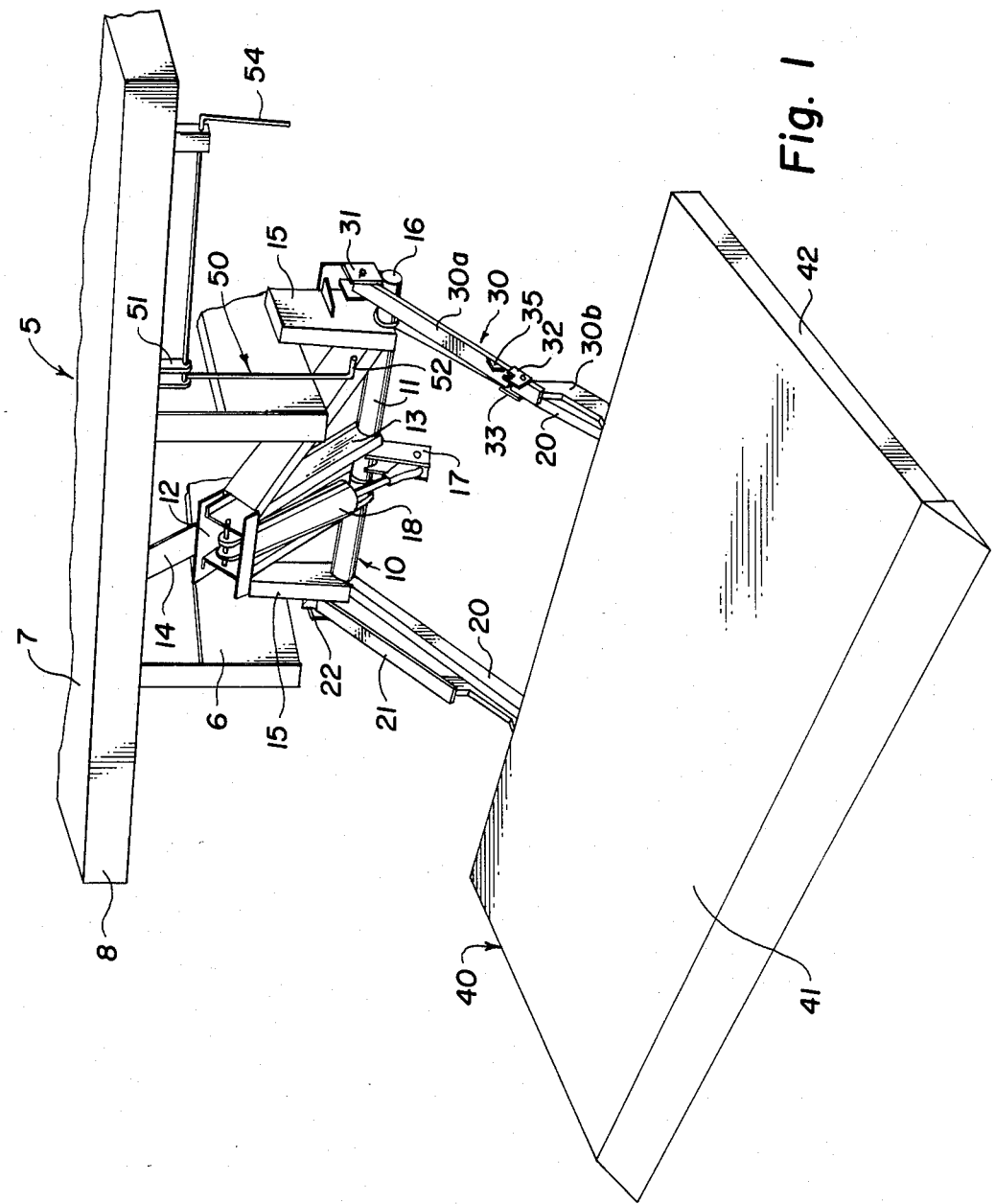
FIG. 1 is a perspective view of a cargo elevator according to the invention, with the platform at the ground position.

Referring to the drawings and particularly FIG. 1 thereof, a cargo elevator according to the invention is mounted at the rear end of a truck 5 having a cargo body mounted on the truck frame 6. The cargo body has a cargo bed 7, may have side walls and a front wall, and may or may not have a rear end wall or gate. Alternatively, the cargo body may consist of an enclosed box including side walls, front wall, roof and a rear door or doors. The cargo body has a rear body cross member or bolster 8 at its rear end.

A mounting frame 10 for the cargo elevator is an A-shaped frame 10 including a pair of axially aligned and spaced bearing sleeves 11 at the lower base end. A short parallel header 12 defines the upper apex end; and this header is connected to the inner ends of the bearing sleeves by a pair of vertical stringers 13. The mounting frame header 12 is disposed generally beneath the rear body cross member 8 and is secured thereto by a rear bracket 14. The bearing sleeve end of the frame is disposed inward from the rear end of the cargo bed 7, so that the frame is angled inwardly or forwardly from the rear body cross member, about 45° for example. A pair of front brackets 15, fixed to the outer ends of the mounting frame bearing sleeves, are secured to the truck frame 6.

A torque shaft 16 is rotatably supported in the bearing sleeves 11, having a length to extend beyond the outer ends of the bearing sleeves, and has a radial torque arm 17 fixed thereto intermediate its ends between the two bearing sleeves. An extensible hydraulic power cylinder 18 is disposed between the stringers 13, and is connected between a pivot mounting adjacent to the frame header 12 and a pivot mounting on the torque arm, to oscillate the torque shaft relative to the mounting frame.

A pair of lift arms 20 are nonrotatably secured to the torque shaft, adjacent to the outer ends of the bearing sleeves 11, and extend generally rearwardly to support the elevator platform as will be described. As best seen in FIG. 3, a street side parallel arm 21 is pivotally attached to a bracket 22, which is rotatably carried at the outer end of the torque shaft 16. This bracket 22 provides a pivot axis for the parallel arm which is parallel to the axis of the torque shaft; and the bracket is normally disposed with the arm pivot axes directly above the torque shaft axis. The associated frame front bracket 15 includes a stop 23 to limit rotational movement of this arm brackets toward the rear (clockwise in FIG. 3). The bracket 22, then, is free to rotate in a forward direction (counterclockwise in FIG. 3) at least 90° to enable the function which will be described subsequently. However, the loading of the cargo elevator will normally maintain the bracket 22 in the described vertical position; and, in this functional position, the bracket is effectively a part of the mounting frame 10.

A curb side parallel arm 30 is an articulated arm consisting of a proximal link 30a pivotally connected to the mounting frame 10, and a distal link 30b pivotally connected to the proximal link at a pivot elbow about an axis parallel to the pivot axis at the mounting frame. The proximal link 30a is pivotally mounted on a bracket 31 which, in the drawing, appears similar to the bracket 23, but which is nonrotatably mounted relative to the associated front bracket 15 of the mounting frame 10. This bracket 31 then defines a pivot axis for the parallel arm 30 which is parallel to the rotational axis of the torque shaft 16.

A cargo platform 40 consists generally of a planar floor panel 41 supported on a suitable frame structure 42 to maintain the platform in a horizontal load position. The frame structure includes arm brackets 43 adjacent to the forward edge of the platform which provided vertically aligned and spaced lift arm pivots 44 and parallel arm pivots 45, as best seen in FIG. 2 The parallel arm pivots are above the lift arm pivots so that, in assembled relation, the lift arms and parallel arms define a parallelogram mounting for the platform, to maintain the platform in planes generally parallel to the cargo bed plane during all cargo handling operations of the elevator. In the upper position of the platform, the forward edge of the platform is butted against the rear body cross member 8 of the vehicle cargo bed 7, with the planes of the bed and platform coinciding to enable ready transfer of cargo onto or off of the elevator platform.

Referring now to the articulated arm 30, the pivot elbow is formed in part by a yoke provided at the forward end of the distal link 30b, the yoke being formed by a hook plate 32 and associated yoke plate 33 welded to the end of the distal link and providing bearing means for a pivot pin 34. The rearward end of the proximal link 30a is received within the yoke and is provided with a transverse bore through which the pivot pin 34 passes.

During the cargo handling operations of the platform, the parallel arms are maintained in tension, so that the articulated arm 30 maintains the alignment which is illustrated in FIGS. 1, 2 and 4. FIG. 2 illustrates the platform at or near the ground position, for loading cargo onto or off from the platform at ground level; and FIG. 4 illustrates the platform in load position partially elevated.

When it is desired to rotate the platform 40 to the vertical storage position, this rotation is effected by positioning a control strut 50 in appropriate coacting relation with the articulated arm, as illustrated in FIG. 2.

As best seen in FIG. 1, the control strut 50 is an elongated arm pivotally suspended from the vehicle bed 7 by brackets 51. The strut 50 has a transverse bearing pin 52 at its lower end for coaction with the articulated arm as will be described. The strut 50 is oscillated manually relative to the truck bed by an operator level 54. The bearing pin 52 of the control strut is configured to coact with a seat provided at the rear end of the proximal link adjacent to the pivot elbow, the seat being defined between the hook plate 32 of the distal link and a lug 35 fixed to the upper face of the proximal link.

The operation of the elevator platform to effect the rotation of the platform from the load position to the vertical storage position, and to return the platform to the load position, will now be described with particular reference to FIGS. 4 through 7. To effect rotation to the storage position, the platform must first be lowered to a point near the ground position, and then raised from that position. When the lift arms and parallel arms are elevated by the power cylinder to a position slightly above horizontal, as illustrated in FIG. 4, the operator strut 50 is maneuvered by the control lever 54 to position the bearing pin in the seat between the hook plate 32 and the lug 35. When the strut pin is engaged in the seat, further upward movement of the proximal link of the articulated arm is prevented; and continued upward movement of the lift arms 20 will cause the distal link 30b to be rotated relative to the proximal link. This results in an effective shortening of the articulated parallel arm 30 relative to its associated lift arm 20 and produces upward rotation of the platform 40 as best seen in FIG. 5. With continued upward movement of the lift arms 20, a rotation continues until the platform is rotated approximately 90° to the generally vertical position illustrated in FIG. 6, and in this position the platform arm pivots 44 and 45 are disposed in a generally horizontal plane. With this rotation of the distal link relative to the proximal link, the hook of the hook plate 32 encloses and confines the bearing pin 52 of the control strut, so that the control strut and proximal link 31a are locked together against any movement relative to the truck.

With hydraulic pressure acting on the lift arms, and with the lift arm pivots 44 being located rearward of the parallel arm pivots 45, the tendence of this lift arm support is to urge the platform forward toward the truck cargo body.

Normally the platform is secured in the vertical storage position by means of chains or linkage to prevent any possibility of the platform rotating rearward during movement of the truck, particularly should hydraulic pressure be lost because of fluid leakage for example. A safety feature of the lift platform of the invention is that, with rearward swinging of the platform restrained by the above mentioned chains or the like, it is not possible for the platform to drop from the storage position because of the above mentioned positive lock between the control strut 50 and the proximal link 30a of the articulated arm.

For the rotating of the platform from the storage position to the load position, the lift arms 20 may be rotated under power, at least initially to start the rearward swing of the platform. Since downward movement of the proximal link is restrained by the control strut, this movement necessarily starts rotation of the platform. After rotation has been initiated, merely releasing the pressure of the lift arms will allow the rotation to the load position to be completed. When the arms have been lowered to the FIG. 4 position slightly above horizontal, the control strut 50 will release automatically from the hook plate 32, and allow operation of the elevator for cargo handling operations until it is next desired to return the platform to the storage position.

FIG. 7 of the drawing illustrates the rotated position of the pivot bracket 22 for the street side parallel arm 21, when the platform is in the storage position. This bracket has been rotated 90° concurrently with the 90° rotation of the platform.

What has been described is a novel elevator platform for use with a cargo vehicle which is fully powered for normal cargo handling operations between a ground position and a bed position, and which is also fully powered for rotation of the platform between a horizontal load position and a vertical storage position behind the truck cargo body.

A feature of the invention is that the mechanism for effecting the rotation between the load position and the storage position is simple, effective and reliable, and is very easy to operate by the user.

Another feature and advantage of the invention is that the mechanism for effecting the rotation of the platform to the storage position, also functions as a safety mechanism to prevent the platform from being displaced from the storage position in the event of hydraulic fluid loss.

While the preferred embodiment of the invention has been illustrated and described, it will be understood by those skilled in the art that changes and modifications may be resorted to without departing from the spirit and scope of the invention.

What is claimed is:

1. A cargo elevator for attachment to a cargo vehicle comprising
a pair of laterally spaced lift arms pivotally mounted on said vehicle for vertical oscillation as a unitary assembly; power means for oscillating said lift arm assembly;
a pair of laterally spaced parallel arms pivotally mounted on said vehicle for vertical oscillation;
an elevator platform pivotally mounted on said lift and parallel arms in a manner to maintain said platform in a generally horizontal load position during the raising and lowering thereof through the oscillation of said arm one each of said life and parallel arms being attached to said platform adjacent to each side thereof;
one of said parallel arms at one side of said platform being an articulated arm having a pivot elbow intermediate its ends;
a control strut mounted on said vehicle to be moved selectively into engagement with said articulated arm;
said control strut being engageable with said articulated arm, during upward movement thereof, to effect articulation thereof and consequent rotation of said platform to a vertical storage position relative to said vehicle;
the other of said parallel arms at the other side of said platform being mounted on said vehicle by means of a movable pivot, to allow said rotation of said platform.

2. A cargo elevator as set forth in claim 1
said lift arms defining compression load members between said vehicle and said platform, and said parallel arms defining tension load members between said vehicle and said platform; said parallel arms being disposed above said lift arms during the raising and lowering of said platform in the load position;
said lift arms thereby supporting said platform at lowermost pivot points in the load position thereof; and said lift arms supporting said platform at outermost pivot points in the vertical position thereof.

3. A cargo elevator as set forth in claim 1
said other parallel arm being pivotally mounted on a movable bracket;
means limiting rearward movement of said bracket to provide a fixed pivot for said arm when a tensile load is maintained thereof;
and said bracket being movable to allow forward movement of said parallel arm pivot relative to said vehicle.

4. A cargo elevator as set forth in claim 1
said other parallel arm being mounted on an oscillating bracket;
said bracket being pivotally mounted on said vehicle about an axis parallel to the oscillating axis of said lift arms;
means limiting rearward rotation of said bracket, whereby said other lift arm maintains tension support for said platform in the load position thereof;
and said bracket mounting permitting rearward rotation thereof to allow rotation of said platform from said load position to said storage position.

5. A cargo elevator as set forth in claim 1
a mounting frame for attachment to the frame of said vehicle;
a torque shaft rotatably supported in said mounting frame; and a fluid power cylinder mounted in association with said torque shaft for oscillating said torque shaft about its axis;
said lift arms being nonrotatably mounted on said torque shaft.

6. A cargo elevator as set forth in claim 5
a bracket rotatably mounted on said torque shaft;
said other parallel arm being pivotally mounted on said rotatable bracket;
means limiting rotation of said rotatable bracket to enable said other parallel arm to function as a tension support member for said platform during the raising and lowering thereof in said load position;
and said rotatable bracket being rotatable away from said limit position to allow rotation of said platform to said storage position.

7.
A cargo elevator for attachment to a cargo vehicle comprising
a pair of laterally spaced lift arms pivotally mounted on said vehicle for vertical oscillation; power means for oscillating said lift arms;
a pair of laterally spaced parallel arms pivotally mounted on said vehicle for vertical oscillation;
an elevator platform pivotally mounted on said lift and parallel arms in a manner to maintain said platform in a generally horizontal load position during the raising and lowering thereof through the oscillation of said arms;
one of said parallel arms being an articulated arm having a pivot elbow intermediate its ends;
a control strut mounted on said vehicle to be moved selectively into engagement with said articulated arm;
said control strut being engageable with said articulated arm, during upward movement thereof, to effect articulation thereof and consequent rotation of said platform to a vertical storage position relative to said vehicle;
said articulated arm comprising a proximal link pivotally connected to said vehicle and a distal link pivotally connected to said elevator platform, said proximal and distal links being pivotally connected to define said pivot elbow;
said control strut having bearing means at its distal end for engagement with said articulated arm; said proximal link having seat means adjacent to said pivot elbow for receiving and locating said control strut bearing means when said articulated arm moves into engagement with said strut;

said distal link having means adjacent to said pivot elbow providing locking means locking said control strut to said articulated arm when said distal link is rotated upward relative to said proximal link;

said control strut having a transverse pin defining said bearing means; said proximal link having a lug spaced from said pivot elbow defining said seat means for receiving and locating said control strut bearing pin adjacent to said elbow;

said distal link having hook means associated therewith at said pivot elbow for enclosing and confining said strut pin when said distal link is rotated upward relative to said proximal link;

and said hook means providing said locking means for preventing subsequent movement of said control strut and said proximal link.

8. A cargo elevator as set forth in claim 7 said control strut, when locked to said proximal link, defining a safety strut preventing downward movement of said elevator platform without accompanying rotation thereof from said storage position.

* * * * *